No. 726,611. PATENTED APR. 28, 1903.
O. E. ABBEY.
THREE-HORSE DRAFT EQUALIZER.
APPLICATION FILED JAN. 29, 1903.
NO MODEL.
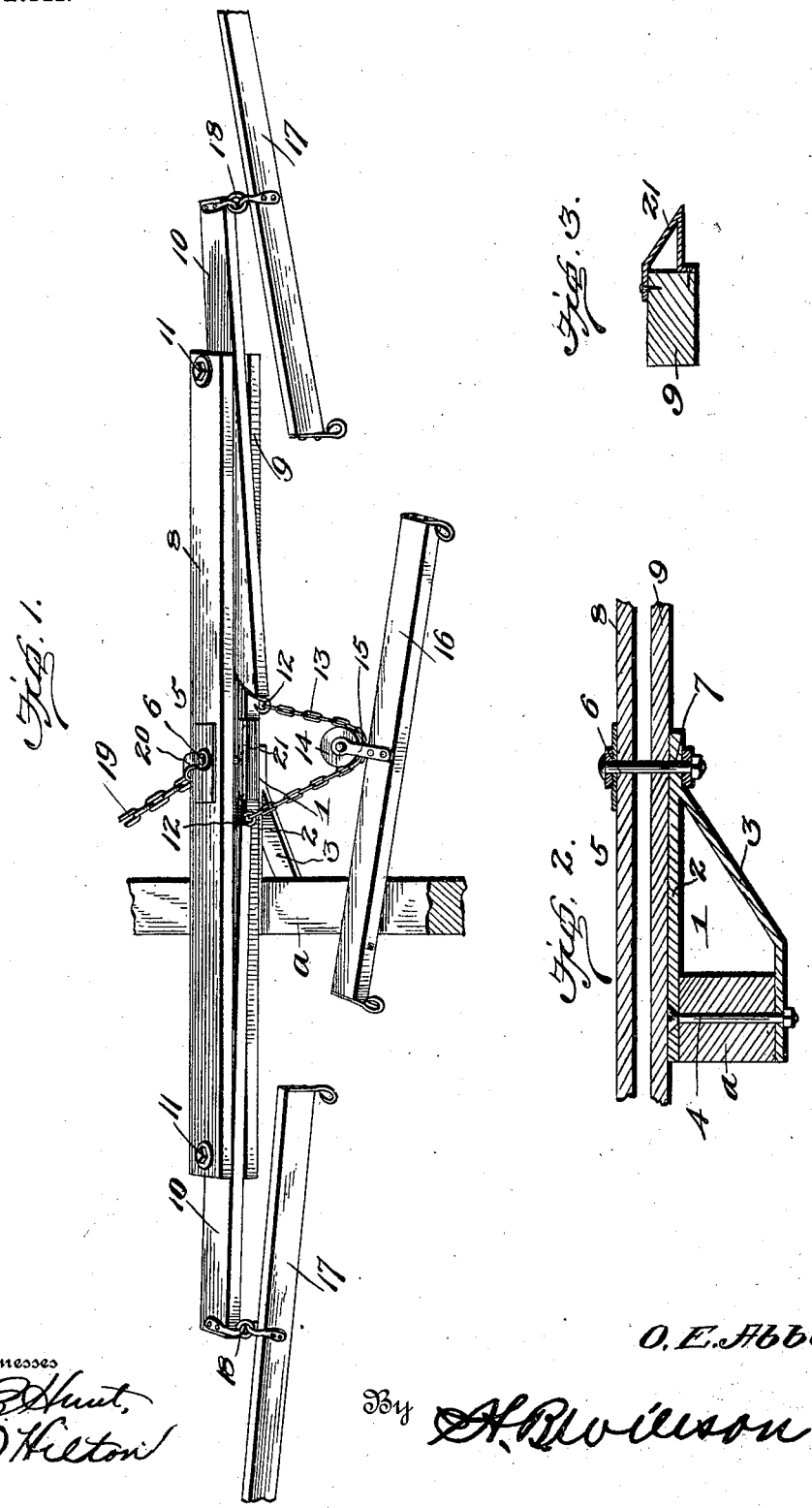
Witnesses
Inventor
O. E. Abbey
By H. R. Wilson
Attorney

UNITED STATES PATENT OFFICE.

ORRA E. ABBEY, OF DAILY, MICHIGAN.

THREE-HORSE DRAFT-EQUALIZER.

SPECIFICATION forming part of Letters Patent No. 726,611, dated April 28, 1903.

Application filed January 29, 1903. Serial No. 141,051. (No model.)

*To all whom it may concern:*

Be it known that I, ORRA E. ABBEY, a citizen of the United States, residing at Daily, in the county of Cass and State of Michigan, have invented certain new and useful Improvements in Three-Horse Draft-Equalizers; and I do declare the following to be a full, clear, and exact description of the invention, such as will enable others skilled in the art to which it appertains to make and use the same.

My invention is an improved three-horse draft-equalizer; and it consists in the peculiar construction and combination of devices hereinafter fully described and claimed.

The object of my invention is to provide a novel device of this character which is adapted to be readily attached to the pole or tongue of any vehicle, agricultural machine, or the like and to equalize the draft between the horses.

Further objects and details of construction are fully set forth in the description hereto appended.

In the accompanying drawings, Figure 1 is a perspective view of a draft-equalizer embodying my improvements. Fig. 2 is a detail transverse sectional view of the same, showing the bracket-arms connected to the pole and to which the doubletree is pivotally connected; and Fig. 3 is a detail transverse sectional view taken through a plane at the center of the doubletree and showing the V-shaped wear-plates with which the same is provided.

In the embodiment of my invention I provide a bracket-arm 1, comprising the upper arm 2 and the lower brace-arm 3, the outer end of which is secured to the outer end of the arm 2, and the inner ends of said arm 2 and brace-arm 3 are adapted to bear, respectively, on the upper and lower sides of the draft tongue or pole *a* and to be pivotally connected thereto by a bolt 4, the head of which is in practice preferably countersunk in the arm 2, said bolt adapting the bracket-arm to be readily attached to and detached from the pole or tongue. The said bracket-arm 1 projects laterally from one side of the pole or tongue, as shown in Figs. 1 and 2, and the central portion of the doubletree 5 is at the outer end of said bracket-arm, said doubletree bearing on said bracket-arm and being connected pivotally thereto by a bolt 6, which is centrally disposed with reference to the doubletree and passes through an opening 7 near the outer end of the bracket-arm. The doubletree comprises an upper section or bar 8 and a lower section or bar 9, which are preferably in practice made of wood and are straight, as shown. Between the end portions of the upper and lower sections of the doubletree the lever-arms 10 are depressed, the said lever-arms spacing the upper and lower sections of the doubletree apart and being pivotally connected to the ends of the doubletree by bolts 11, which bolts pass through openings in said lever-arms about one-third their length from their outer ends, so that one-third or substantially one-third of each lever-arm projects beyond one end of the doubletree, the inner longer portions of the lever-arms being adapted to operate between the upper and lower sections of the doubletree, as shown. The said lever-arms are provided at their inner ends with hooks 12, to which are detachably connected the ends of a chain 13, which chain is engaged by a pulley 14, carried on the rear side and at the center of the central singletree 16 for the middle horse. As here shown, the said pulley 14 is mounted between a pair of rearwardly-extending straps or bars 15, with which the central singletree 16 is provided; but in practice any suitable means may be employed to mount the said pulley, and I do not limit myself in this particular.

The outer singletrees 17 are each flexibly connected, as at 18, to the outer end of one of the lever-arms 10. A draft-chain 19, the rear end of which may be connected to the pole or to the front axle or to any other relatively fixed part of the wagon or vehicle, is provided at its front end with a yoke 20, which engages the end portions of the bolt 6, which pivots the doubletree on the bracket 1.

It will be understood from the foregoing and by reference to the drawings that my improved draft-equalizer is efficient in distributing the load equally to the three horses and that it effectually prevents side draft.

To prevent the doubletree from becoming chafed and worn by the chain 13, which moves with the inner ends of the lever-arms 10, I provide wear-plates 21, which are substantially V-shaped in side elevation and which are attached to the front sides of the sections of the doubletree at the points where the chain 13 would otherwise contact therewith.

From the foregoing description, taken in connection with the accompanying drawings, the construction, mode of operation, and advantages of my invention will be readily apparent, it is thought, without requiring a more extended explanation.

Various changes in the form, proportion, and the minor details of construction may be resorted to without departing from the principle or sacrificing any of the advantages of the invention.

Having thus described my invention, what I claim as new, and desire to secure by Letters Patent of the United States, is—

In apparatus of the class described, a doubletree having upper and lower bars spaced apart and provided on their front sides with substantially V-shaped wear-plates, in combination with lever-arms pivotally connected to the doubletree, a chain connecting the inner ends of said lever-arms together, the wear-plates being so disposed as to contact with the chain when the lever-arms move, outer singletrees carried by the outer ends of said lever-arms, and a center singletree having a pulley engaging said chain, substantially as described.

In testimony whereof I have hereunto set my hand in presence of two subscribing witnesses.

ORRA E. ABBEY.

Witnesses:
JOHN S. HAINES,
A. E. VOSBURGH.